US012227717B2

(12) United States Patent
Lo et al.

(10) Patent No.: US 12,227,717 B2
(45) Date of Patent: *Feb. 18, 2025

(54) PRESSED MANUAL DISH DETERGENT

(71) Applicant: ECOLAB USA INC., Saint Paul, MN (US)

(72) Inventors: Wendy Lo, Saint Paul, MN (US); Erik C. Olson, Saint Paul, MN (US); Thomas Muller, Saint Paul, MN (US); Jeffrey John Biggs, Saint Paul, MN (US); Angela Sivanich, Saint Paul, MN (US); Katherine Molinaro, Saint Paul, MN (US); Kelsey West, Saint Paul, MN (US); Matthew Paul Molinaro, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,173

(22) Filed: Jul. 19, 2023

(65) Prior Publication Data

US 2024/0026247 A1 Jan. 25, 2024

Related U.S. Application Data

(63) Continuation of application No. 17/649,619, filed on Feb. 1, 2022, now Pat. No. 11,746,304, which is a (Continued)

(51) Int. Cl.

*C11D 1/02* (2006.01)
*B08B 3/04* (2006.01)
(Continued)

(52) U.S. Cl.

CPC .................. *C11D 1/24* (2013.01); *C11D 1/22* (2013.01); *C11D 1/94* (2013.01); *C11D 3/046* (2013.01);
(Continued)

(58) Field of Classification Search

CPC .... C11D 1/02; C11D 1/26; C11D 1/90; C11D 3/02; C11D 3/04; C11D 3/10; C11D 3/32;
(Continued)

(56) References Cited

U.S. PATENT DOCUMENTS 3,766,254 A 10/1973 Sharman et al.
3,816,352 A 6/1974 Loureiro et al.
(Continued)

FOREIGN PATENT DOCUMENTS

AU 198285066 A 6/1982
AU 1098322103 A 12/1983
(Continued)

OTHER PUBLICATIONS

Ecolab USA Inc., PCT/US2016/065303 filed Dec. 7, 2016, "The International Search Report and the Written Opinion of the International Searching Authority, or the Declaration", 10 pages, mailed Mar. 13, 2017.

(Continued)

*Primary Examiner* — Brian P Mruk
(74) *Attorney, Agent, or Firm* — McKee, Voorhees & Sease, PLC

(57) ABSTRACT

A solid block detergent composition is described which can be dispensed with a water spray to form an aqueous detergent for cutting and removing grease, removing and suspending soils and rinsing easily leaving cleaned ware. The solid block detergent contains a neutralized sulfonated anionic surfactant in combination with various processing aids to optimize soil removal in a formulation that can be pressed for form a solid.

16 Claims, 4 Drawing Sheets

Related U.S. Application Data continuation of application No. 16/823,177, filed on Mar. 18, 2020, now Pat. No. 11,268,045, which is a continuation of application No. 14/962,064, filed on Dec. 8, 2015, now Pat. No. 10,626,350.

(51) Int. Cl.

| | |
|---|---|
| ***C11D 1/22*** | (2006.01) |
| ***C11D 1/24*** | (2006.01) |
| ***C11D 1/26*** | (2006.01) |
| ***C11D 1/90*** | (2006.01) |
| ***C11D 1/94*** | (2006.01) |
| ***C11D 3/02*** | (2006.01) |
| ***C11D 3/04*** | (2006.01) |
| ***C11D 3/10*** | (2006.01) |
| ***C11D 3/32*** | (2006.01) |
| ***C11D 3/37*** | (2006.01) |
| ***C11D 11/00*** | (2006.01) |
| ***C11D 17/00*** | (2006.01) |

(52) U.S. Cl.

CPC ............ *C11D 3/10* (2013.01); *C11D 17/0047* (2013.01); *C11D 17/006* (2013.01); *C11D 17/0073* (2013.01); *C11D 2111/14* (2024.01)

(58) Field of Classification Search

CPC ....... C11D 3/37; C11D 11/00; C11D 17/0047; B08B 3/04

See application file for complete search history.

(56) References Cited

U.S. PATENT DOCUMENTS

| | | | | |
|---|---|---|---|---|
| 3,869,412 | A | 3/1975 | Waag | |
| 3,920,586 | A | 11/1975 | Bonaparte et al. | |
| 4,196,103 | A | 4/1980 | Richter | |
| 4,252,664 | A | 2/1981 | Inamorato | |
| 4,320,033 | A | 3/1982 | Yoshikawa | |
| 4,350,619 | A | 9/1982 | Nakamura et al. | |
| 4,365,853 | A | 12/1982 | Ehrlich | |
| 5,108,642 | A * | 4/1992 | Aszman | C11D 3/2082 510/381 |
| 6,150,317 | A | 11/2000 | D'Ambrogio et al. | |
| 6,172,021 | B1 | 1/2001 | Ofosu-Asante et al. | |
| 6,387,870 | B1 | 5/2002 | Klaers et al. | |
| 6,528,477 | B2 | 3/2003 | Kasturi et al. | |
| 6,689,732 | B1 * | 2/2004 | Guedira | C11D 3/3945 510/424 |
| 6,740,630 | B2 | 5/2004 | Aouad et al. | |
| 6,759,382 | B2 | 7/2004 | Ahmed | |
| 6,774,099 | B1 | 8/2004 | Scheibel et al. | |
| 7,326,675 | B2 | 2/2008 | Schneiderman et al. | |
| 7,332,467 | B2 | 2/2008 | Schneiderman et al. | |
| 8,815,790 | B2 | 8/2014 | Masters et al. | |
| 10,626,350 | B2 * | 4/2020 | Lo | C11D 3/10 |
| 11,268,045 | B2 * | 3/2022 | Lo | C11D 17/0047 |
| 11,746,304 | B2 * | 9/2023 | Lo | C11D 17/0073 510/220 |
| 2010/0056413 | A1 | 3/2010 | Harry, Jr. et al. | |
| 2011/0112003 | A1 * | 5/2011 | Mohs | C11D 3/044 510/218 |
| 2013/0123164 | A1 | 5/2013 | Jones et al. | |
| 2014/0080748 | A1 | 3/2014 | Price et al. | |
| 2015/0119312 | A1 | 4/2015 | Sanders et al. | |

FOREIGN PATENT DOCUMENTS

| | | | | |
|---|---|---|---|---|
| AU | 198544217 | A | 7/1984 | |
| AU | 198546995 | A | 9/1985 | |
| AU | 199335221 | A | 3/1993 | |
| CA | 2040307 | A1 | 4/1991 | |
| CA | 2254737 | C | 12/1997 | |
| CA | 2688927 | C | 6/2014 | |
| EP | 0178893 | A2 | 4/1986 | |
| EP | 0267042 | A2 | 11/1987 | |
| EP | 1036839 | A2 | 2/2000 | |
| EP | 1221475 | B1 | 1/2002 | |
| EP | 1418224 | A1 | 5/2004 | |
| EP | 1180129 | B1 | 9/2007 | |
| GB | 1454895 | A | 11/1972 | |
| GB | 1489867 | A | 10/1977 | |
| IN | 184031 | B | 6/2000 | |
| IN | 184056 | B | 6/2000 | |
| IN | 188383 | B | 9/2002 | |
| IN | 200900996 | P3 | 7/2009 | |
| IN | 20141913 | P1 | 3/2014 | |
| IN | 201407698 | P1 | 5/2015 | |
| JP | 50155507 | A | 12/1975 | |
| JP | 2001515952 | A | 9/2001 | |
| JP | 2001515954 | A | 9/2001 | |
| JP | 2005511820 | A | 4/2005 | |
| WO | 9402573 | A1 | 2/1994 | |
| WO | 9805742 | A1 | 2/1998 | |
| WO | 9913039 | A1 | 3/1999 | |
| WO | 9963034 | A1 | 12/1999 | |
| WO | 0040551 | A1 | 7/2000 | |
| WO | 0043476 | A1 | 7/2000 | |
| WO | 200058436 | A1 | 10/2000 | |
| WO | WO 00/58436 | * | 10/2000 | C11D 17/00 |
| WO | 0071659 | A1 | 11/2000 | |
| WO | 0127228 | A1 | 4/2001 | |
| WO | 0194509 | A2 | 12/2001 | |
| WO | 03089560 | A2 | 10/2003 | |
| WO | 2006063668 | A1 | 6/2006 | |
| WO | WO-2007093651 | A1 * | 8/2007 | C11D 1/22 |
| WO | 2007104805 | A1 | 9/2007 | |
| WO | 2013043803 | A2 | 3/2013 | |
| WO | 2013043852 | A2 | 3/2013 | |
| WO | 2013043855 | A2 | 3/2013 | |
| WO | 2013148639 | A1 | 10/2013 | |

OTHER PUBLICATIONS

European Patent Office, extended European Search Report of Application No. 18190999.5, 6 pages, mailed Dec. 12, 2018.

* cited by examiner

PRESSED MANUAL DISH DETERGENT

CROSS REFERENCE TO RELATED APPLICATION

This application is a continuation of U.S. Ser. No. 17/649,619, filed Feb. 1, 2022, now U.S. Pat. No. 11,746,304, issued Sep. 5, 2023, which is a continuation of U.S. Ser. No. 16/823,177, filed Mar. 18, 2020, now U.S. Pat. No. 11,268,045, issued Mar. 8, 2022, which is a continuation of U.S. Ser. No. 14/962,064, filed Dec. 8, 2015, now U.S. Pat. No. 10,626,350, issued Apr. 21, 2020, all of which are herein incorporated by reference in their entirety.

FIELD OF THE INVENTION

The application relates to solid detergent materials. The invention relates to a solid detergent composition containing a detergent formulation dispersed in a matrix. The combination of ingredients provides excellent soil removal, grease cutting and controlled foaming in an aqueous detergent composition made from the solid.

BACKGROUND OF THE INVENTION

The development of solid block cleaning compositions has revolutionized the manner in which detergent compositions are dispensed by commercial and institutional entities that routinely use large quantities of cleaning materials. Solid block compositions offer unique advantages over the conventional liquids, granules or pellet forms of detergents, including improved handling, enhanced safety, elimination of component segregation during transportation and storage, and increased concentrations of active components within the composition. Because of these benefits, solid block cleaning compositions, such as those disclosed in Fernholz, et al., U.S. Pat. Nos. Re 32,763, Re 32,818, 4,680,134 and 4,595,520, have quickly replaced the conventional composition forms in commercial and institutional markets. Another sodium hydroxide and sodium carbonate cast solid process using substantially hydrated sodium materials was disclosed in Heile et al. U.S. Pat. Nos. 4,595,520 and 4,680,134. Further, pelletized materials are shown in Gladfelter et al., U.S. Pat. Nos. 5,078,301, 5,198,198 and 5,234,615. Extruded materials are disclosed in Gladfelter et al., U.S. Pat. No. 5,316,688. The solid block format is a safe, convenient and efficient product format.

Various hardening mechanisms have been used in cleaning and sanitizing compositions for converting a fluid composition to a solid mass for containment and modification of the solubility of the active ingredients during use. For example, the active ingredients may be combined with the hardening agent under melting temperatures, commonly referred to as a "molten process," to achieve a homogeneous mixture, wherein the melt is then poured into a mold and cooled to a solid form.

Solid block cleaning and sanitizing compositions and detergents provide a significant improvement over the conventional liquid, granular and pelletized cleaning compositions. Although the molten process is useful for preparing solid block compositions, time and expense would be saved if heating and cooling of the composition could be minimized or eliminated from the process, and higher viscosities could be used. Also, lower process temperatures would better facilitate the use of heat-sensitive ingredients in cleaning compositions. In addition, less sturdy packaging would be required if the processed mixture could be packaged at a lower temperature. Furthermore, eliminating molten temperatures would avoid swelling and deformation of the solid product.

Various attempts have been made to manufacture cleaning compositions by an extrusion process. U.S. Pat. No. 5,061,392 to Bruegge et al., for example, discloses a method of forming a detergent composition having a paste-like consistency, by combining a first aqueous solution containing a potassium tripolyphosphate and a second aqueous solution containing a water-soluble, sodium-based detergent builder, namely sodium hydroxide. Upon mixing, the viscosity of the mixture rapidly increases to form a highly viscous paste. In another extrusion method, as disclosed in U.S. Pat. No. 4,933,100 to Ramachandran, an organic detergent of particulate or patty form is formed by kneading together a synthetic organic detergent, a hydratable builder salt such as sodium tripolyphosphate, and water. The mixture is passed through an extruder and forced through openings at or slightly above room temperature and a low pressure to form a rod-shaped extrudate. A disadvantage of these processes is that a caustic, hydratable alkaline source is required to facilitate hardening of the processed composition after extrusion.

As can be seen there is a need in the art for development of cleaning composition which can be formed into solids by less involved processes such as by pressing. Aqueous cleaning compositions have commonly been used in applications including hospital, household, institutional and industrial services, hand and body soaps, laundry soaps, ware washing and housekeeping surfaces. Typically, these cleaning materials are made by diluting liquid or gelled materials to form a use solution. Many such solutions have had some success in the past, however, a substantial need in this art exists to manufacture an easily used concentrate having minimal water and a high actives concentration, excellent soil, e.g. grease, removal properties and controlled foaming. Many prior art materials even in a concentrate form contain substantial amounts of water which is difficult to manufacture, transport and sell. The materials also may have some soil removal properties but improving grease removal and hard surface cleaners is a continuing need or requirement. Further, the manufacture of materials that produce useful foam in the presence of large quantities of greasy soil is a continuing challenge for this marketplace.

SUMMARY OF THE INVENTION

Applicants have developed solid detergent formulations which may preferably be prepared by pressing. The materials of the present invention are solids in that they have a distinct solid character, have a measurable penetrometer value The solid block materials do not rely on a gelling mechanisms in which water combines with solid materials to form a gel, and do not require heating such as by cast molding, or extrusion. In fact, in a preferred embodiment, the composition is free of traditional hardening agents such as urea or PEG.

The solid pressed compositions of the invention have similar or better performance as demonstrated by foam height and grease/soil removal when compared to traditional solid detergents and are formed into solid units. According to the invention, high amounts of anionic surfactants, prolong the effectiveness of grease/soil removal; however, high actives also hinder the press process of preparing a solid detergent. Formulations were optimized to achieve similar or better performance to traditional extruded solid detergents while maintaining the availability pressed solid formation.

We have found that many of the needs can be met by forming a solid block detergent composition with high active content, minimal water content. The pressed compositions are preferably free of cationic surfactants, and hardening agents such as PEG. The composition includes an anionic sulfonate surfactant which is present in an amount of from 0.01 to 97 wt. % of the composition. The composition also includes one or more processing aids which can make up the remainder of the composition. The processing aids may be selected from the group including an inorganic salt, organic salt, a co-surfactant, a carbonate, a silicate, or an acrylic polymer system.

The invention is also found in a detergent composition which contains about 1 to 95 wt-% of a neutralized sulfonated anionic surfactant including a mixed alkali metal alkaline earth metal salt of an organic sulfonate, an organic sulfate surfactant or mixture of such surfactants, and an effective amount of a processing aid including an inorganic salt, an organic salt, a co-surfactant, a carbonate of silicate or acrylic polymer system, or mixture thereof. The cleaning compositions may further include conventional detergent components such as an nonionic or amphoteric surfactant, a sequestering agent, an enzyme, an optional hardening agent, detergent filler, defoamer, an anti-redeposition agent, a threshold agent or system, an aesthetic enhancing agent (i.e., dye, perfume), and other like additives. Adjuvants and other additive ingredients will vary according to the type of composition being manufactured. The invention is further found in a pressed solid block detergent composition as above defined which, when diluted with water, forms an aqueous detergent with stable foam and greasy soil removing capacity. The solid block detergent is useful in cleaning pots and pans, especially in manually washing pots and pans.

DETAILED DESCRIPTION

Figure 1A:
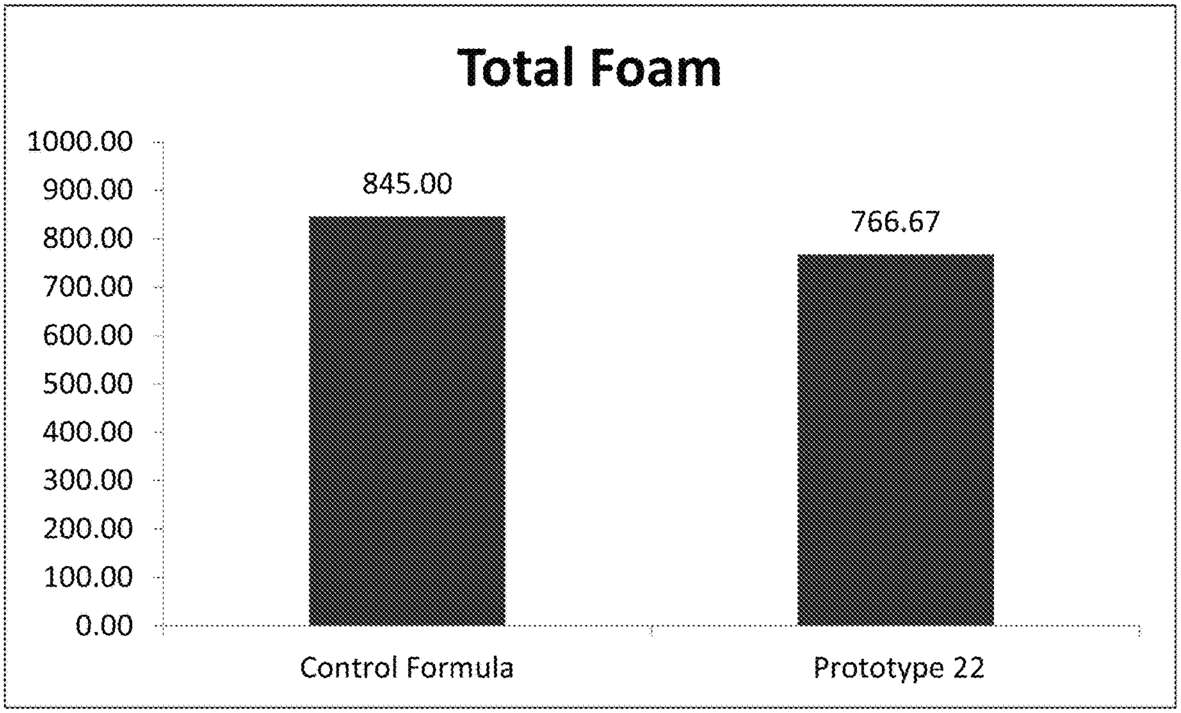
FIGS. 1A and 1B are graphs that show the total foam and the foam profile of prototype 22 verses Control formula.
Figure 1B:
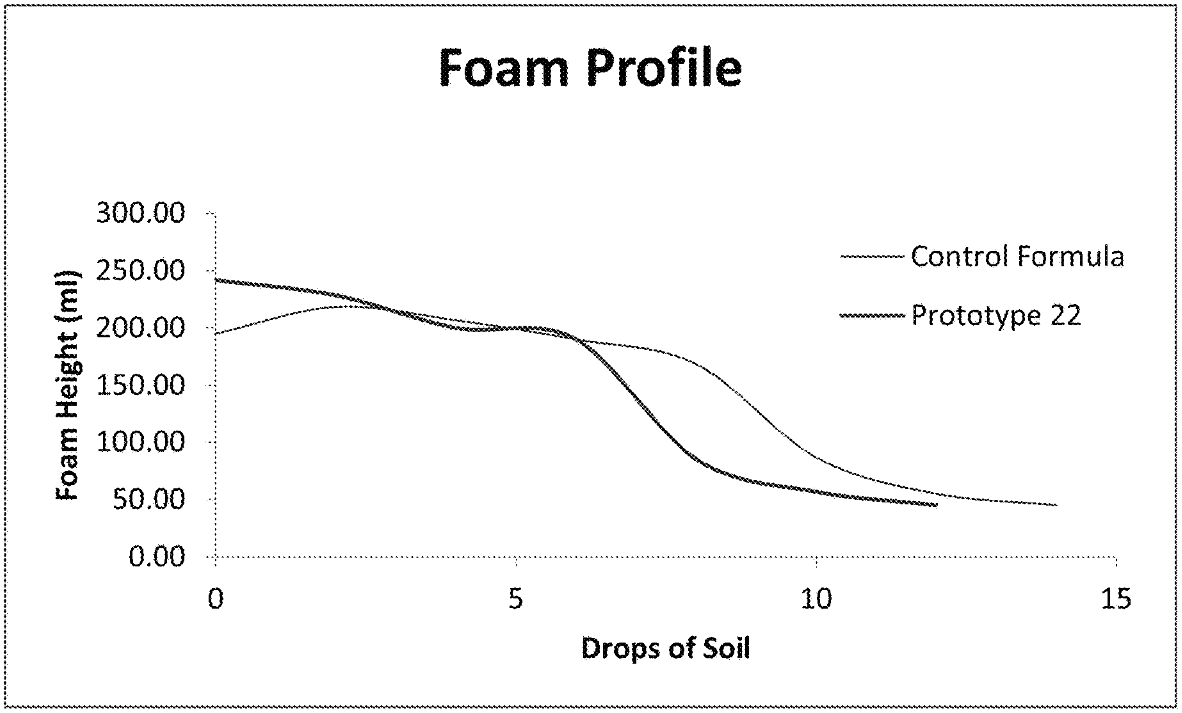
Figure 2A:
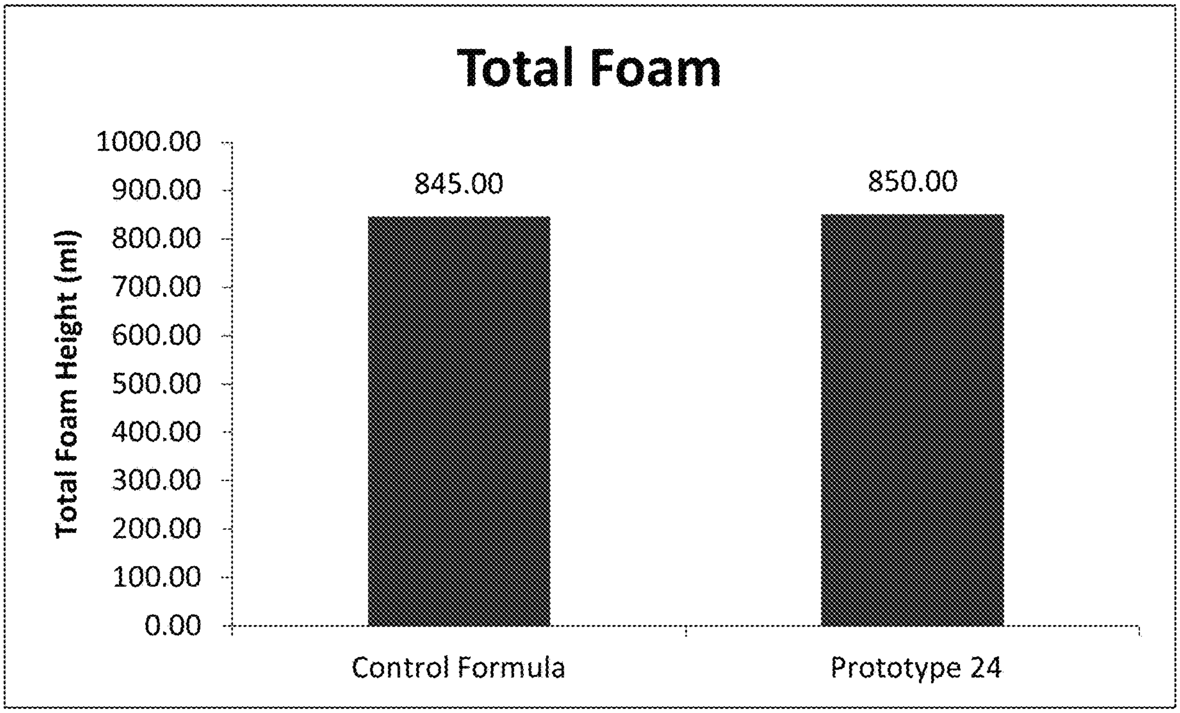
FIGS. 2A and 2B are graphs that show the total foam and the foam profile of prototype 24 verses Control formula.
Figure 2B:
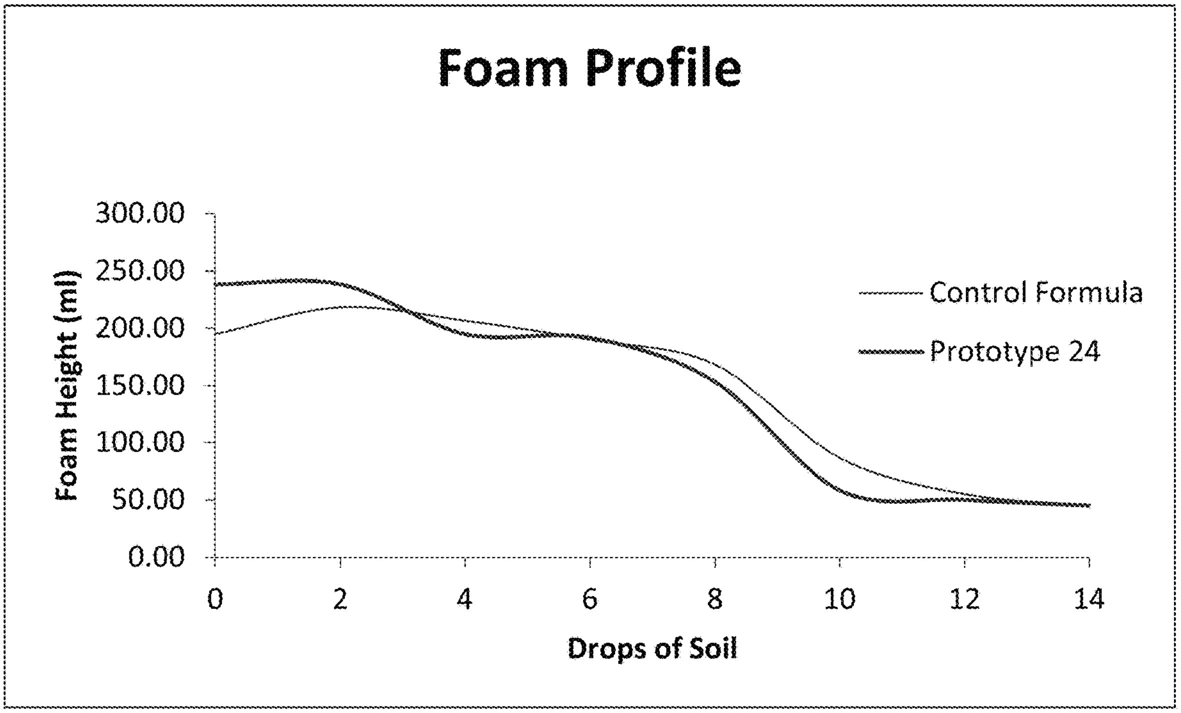
Figure 3A:
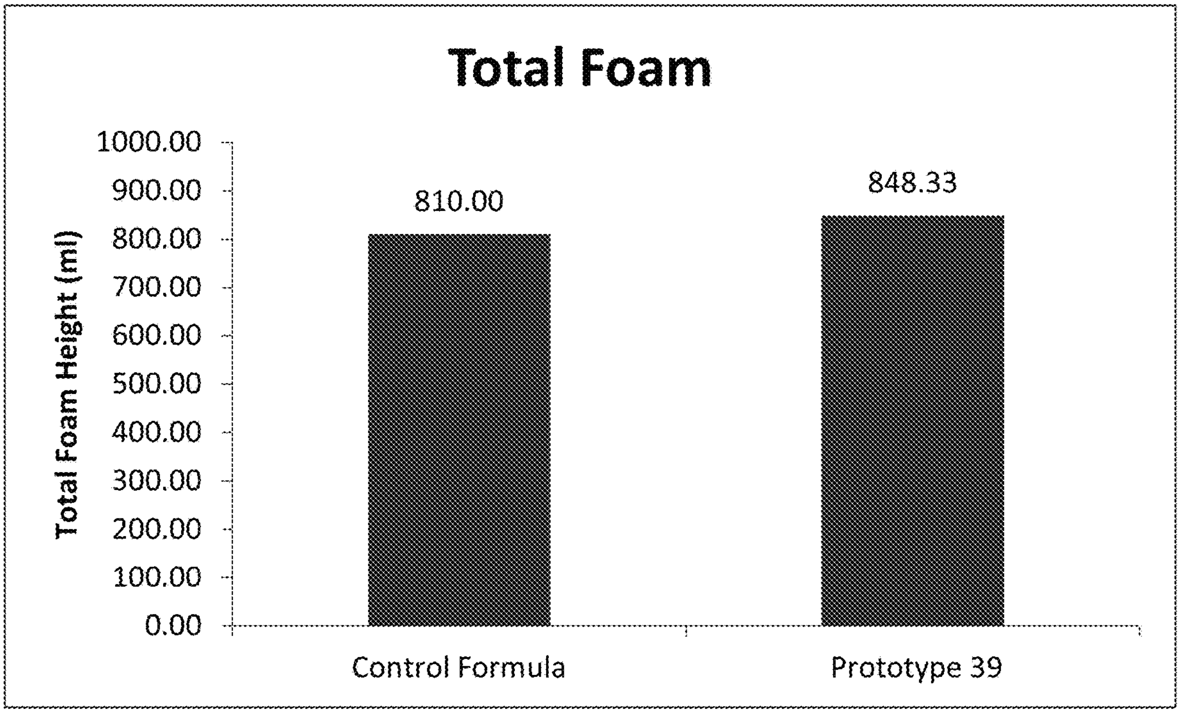
FIGS. 3A and 3B are graphs that show the total foam and the foam profile of prototype 39 verses Control formula.
Figure 3B:
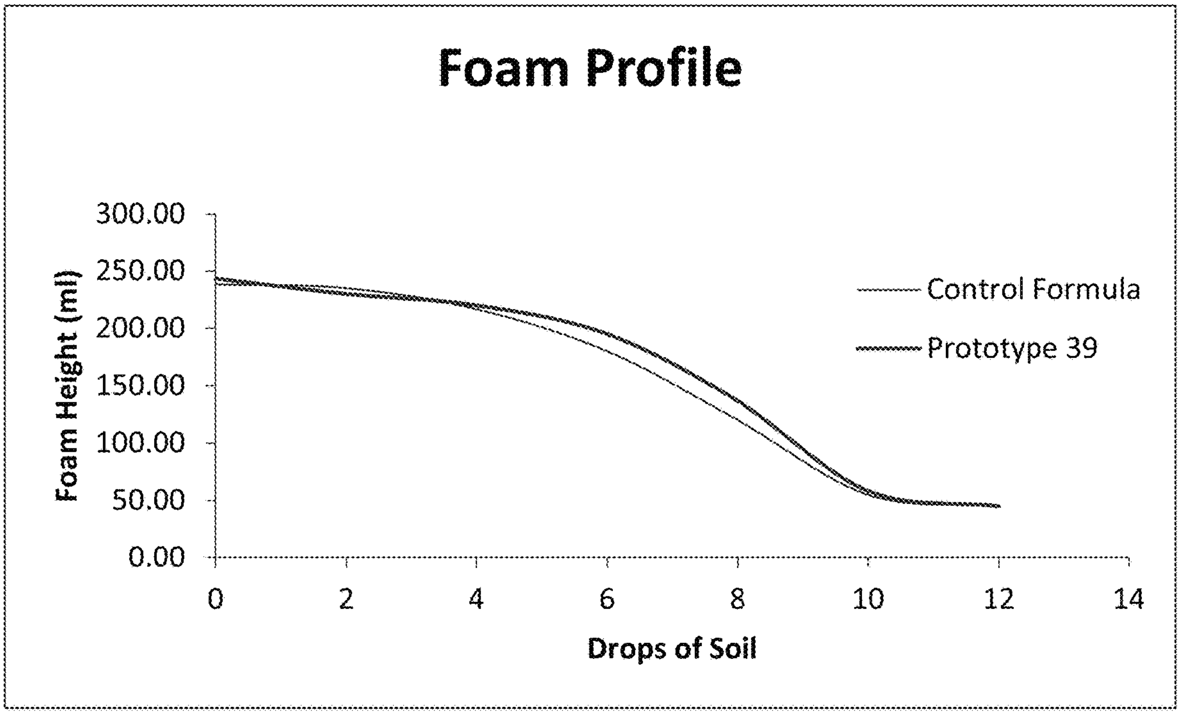
Figure 4:
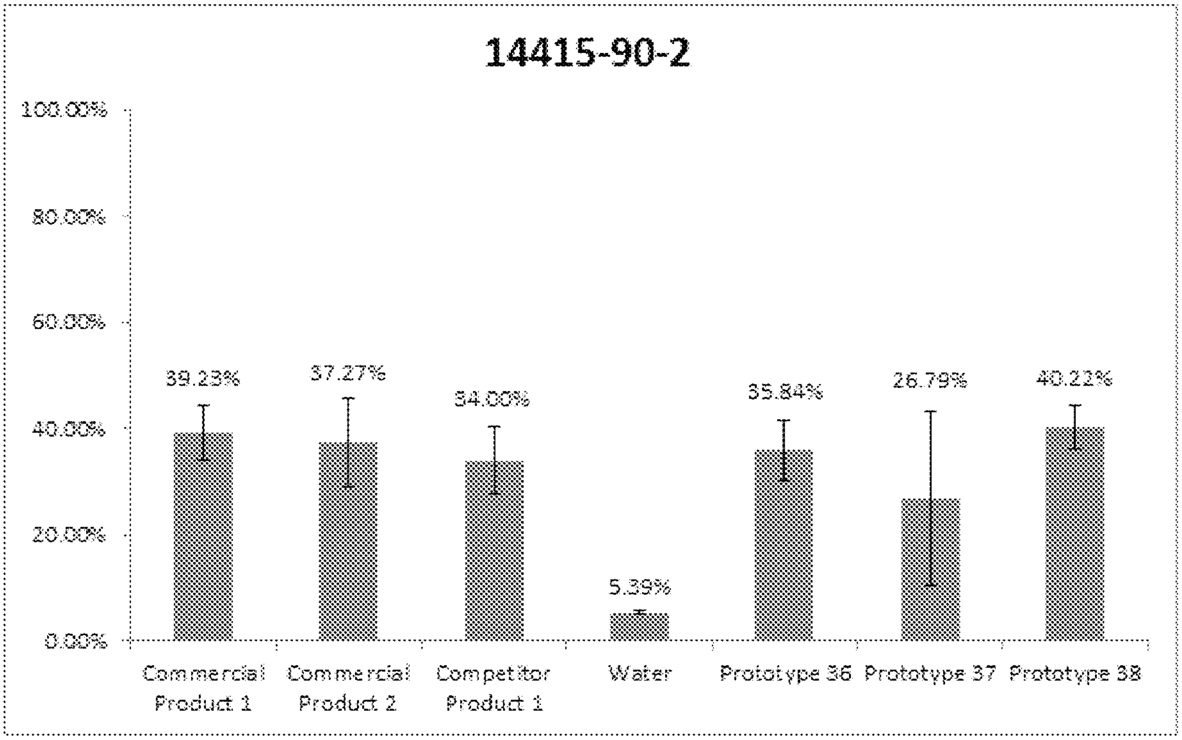
FIG. 4 is a graph of Commercial products 1 and 2, Competitor Product 1, and prototypes 36, 37, and 38 compared to water for % soil removed.
Figure 5:
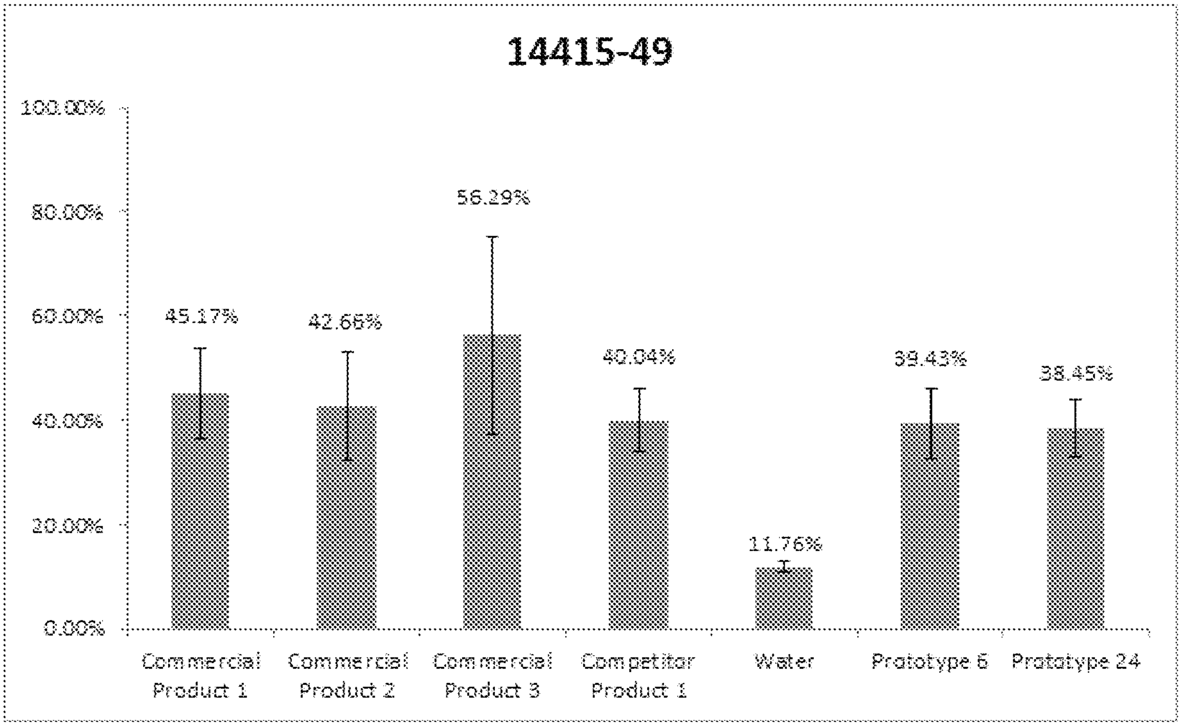
FIG. 5 is a graph of Commercial products 1, 2, and 3, Competitor Product 1, and prototypes 6 and 24 compared to water for % soil removed.

For the following terms, these meanings shall be applied, unless a different meaning is given or indicated in the claims or elsewhere in this specification. Other than in the operating examples, or where otherwise indicated, all numbers expressing quantities of ingredients or reaction conditions used herein are to be understood as being modified in all instances by the term "about".

As used herein, weight percent (wt-%), percent by weight, % by weight, and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

The term "surfactant" or "surface active agent" refers to an organic chemical that when added to a liquid changes the properties of that liquid at a surface.

"Cleaning" means to perform or aid in soil removal, bleaching, microbial population reduction, rinsing, or combination thereof.

As used herein, the term "hard surface" includes showers, sinks, toilets, bathtubs, countertops, windows, mirrors, transportation vehicles, floors, food manufacturing equipment (usually stainless steel), walls, ceiling, piping, conduit, any surface that can get soiled in a food production environment and the like. These surfaces can be those typified as "hard surfaces" (such as walls, floors, bed-pans).

As used herein, a solid cleaning composition refers to a cleaning composition in the form of a solid such as a powder, a particle, an agglomerate, a flake, a granule, a pellet, a tablet, a lozenge, a puck, a briquette, a brick, a solid block, a unit dose, or another solid form known to those of skill in the art. The term "solid" refers to the state of the cleaning composition under the expected conditions of storage and use of the solid detergent composition. In general, it is expected that the detergent composition will remain in solid form when exposed to temperatures of up to about 100° F. and greater than about 120° F. A cast, pressed, or extruded "solid" may take any form including a block. When referring to a cast, pressed, or extruded solid it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid cast composition can range from that of a fused solid block, which is relatively dense and hard, for example, like concrete, to a consistency characterized as being malleable and sponge-like, similar to caulking material.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

The term "actives" or "percent actives" or "percent by weight actives" or "actives concentration" are used interchangeably herein and refers to the concentration of those ingredients involved in cleaning expressed as a percentage minus inert ingredients.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both. This degree of cleanliness may, depending on the particular cleaning product and particular substrate, correspond to a general absence of visible soils, or to some lesser degree of cleanliness, as explained in the prior paragraph.

As used herein, the terms "free" or "essentially free" in reference to a particular compound refers to a composition, mixture, or ingredients that do not contain the compound or to which the same has not been added. Should these compounds be present through contamination of a composition, mixture, or ingredients, the amount of the same shall be less than 0.5 wt. %. In another embodiment, the amount of is less than 0.1 wt. % and in yet another embodiment, the amount is less than 0.01 wt. %.

Compositions of the Invention

The solid block detergents of the invention contain a package of surfactants including a neutralized sulfonated anionic surfactant, and a processing aid. The solid block detergent can be dispensed with water to form an aqueous detergent for cutting and removing grease, removing and suspending soils and rinsing easily leaving cleaned ware. The aqueous detergent concentrate can be used in a cleaning liquid having exceptional soil, particularly grease removing properties with stable foam properties. The detergent formulations are easily pressed for manufacturing efficiency.

Anionic Surfactants

Anionic surfactants useful in the present cleaning compositions include, for example, sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like. Preferred anionics include an organic sulfonate surfactant or an organic sulfate surfactant. More preferred anionics include an alkylsulfonate, alkylarylsulfonate, sulfonated fatty acid ester, sulfated alcohol, sulfated alcohol ethoxylate, sulfated alkylphenol, alkyl sulfate, dialkylsulfosuccinate, alkylethersulfate, and mixtures thereof.

In the invention, the anionic surfactant(s) may be neutralized with an alkali metal salt and/or an alkaline earth salt or a mixture thereof. Other alkaline options include amines. Preferably, a mixture of salts is used, and the alkali metal is sodium and the alkaline earth metal is magnesium. Preferably, the molar ratio of sodium to magnesium is from about 3:1 to 1:1, and, most preferably, the molar ratio of sodium to magnesium is about 2:1. Without wishing to be limited by theory, it is believed that the sodium cation serves to enhance solubility of the surfactant in water while the magnesium cation enhances solubility in oil. The anionic surfactant component makes up the majority of the composition, from 0.01 wt. % to as much as 97 wt %. Preferably from 1 to 99 wt. % and more preferably from about 10 to 80 wt. %.

Processing Aids

The remainder of the composition can include one or more processing aids. Processing aids can include various sources of alkalinity, inorganic salts, organic salts, co-surfactants, silicates, or acrylic polymers.

Inorganic Salts

Processing aides include hydratable inorganic salts, such as sulfates, acetates, carbonates, and bicarbonates. Inorganic salts are present at concentrations of about 0 to 50 wt-%, preferably about 5-25 wt-%, more preferably about 5-15 wt-%.

Acrylic Polymers

Polyacrylates suitable for use as cleaning agents include, for example, polyacrylic acid, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. Acrylic polymers are present at concentrations of about 0 to 50 wt-%, preferably about 5-25 wt-%, more preferably about 5-15 wt-%.

Preferred Nonionic Co-Surfactants

Nonionic surfactants useful in the present detergent compositions may include those having a polyalkylene oxide polymer as a portion of the surfactant molecule. Such nonionic surfactants include, for example, alcohol alkoxylates such as alcohol ethoxylate propoxylates, alcohol propoxylates, alcohol propoxylate ethyoxylate propoxylates, alcohol ethoxylate butoxylates, and the like, and alkyl-capped alcohol alkoxylates; polyoxyethylene glycol ethers of fatty alcohols such as CETEARETH®-27 or PARETH® 25-7, and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark PLURONIC® (BASF-Wyandotte), and the like; and other like nonionic compounds.

Preferably, the nonionic surfactant used is a fatty acid amide. More preferably, the nonionic surfactant employed may be lauric monoethanol amide, cocomonoethanol amide, or a mixture thereof. When present the nonionic surfactant can be from about 0.1 wt. % to about 25 wt. %, preferably from about 1 wt. % to about 20 wt. % and more preferably from about 2 wt. % to about 15 wt. %.

Alkaline Sources

The cleaning composition produced according to the invention may include minor but effective amounts of one or more alkaline sources to neutralize the anionic surfactants and improve soil removal performance of the composition. Accordingly, an alkali metal or alkaline earth metal hydroxide or other hydratable alkaline source, is preferably included in the cleaning composition in an amount effective to neutralize the anionic surfactant. However, it can be appreciated that an alkali metal hydroxide or other alkaline source can assist to a limited extent, in solidification of the composition. Although the amount of alkali metal and alkaline earth metal hydroxide is necessitated to neutralize the anionic surfactant as above described, additional alkaline sources may be present to a point where the pH of an aqueous solution does not exceed 11.5 and more preferably does not exceed 10.

Suitable alkali metal hydroxides include, for example, sodium or potassium hydroxide. Suitable alkaline earth metal hydroxides include, for example, magnesium hydroxide. An alkali or alkaline earth metal hydroxide may be added to the composition in the form of solid beads, dissolved in an aqueous solution, or a combination thereof. Alkali and alkaline earth metal hydroxides are commercially available as a solid in the form of prilled beads having a mix of particle sizes ranging from about 12-100 U.S. mesh, or as an aqueous solution, as for example, as a 50 wt-% and a 73 wt-% solution. It is preferred that the alkali or alkaline earth metal hydroxide is added in the form of an aqueous solution, preferably a 50 wt-% hydroxide solution, to reduce the amount of heat generated in the composition due to hydration of the solid alkali material.

A cleaning composition may include a secondary alkaline source other than an alkali metal hydroxide. Examples of secondary alkaline sources include a metal silicate such as sodium or potassium silicate or metasilicate, a metal carbonate such as sodium or potassium carbonate, bicarbonate or sesquicarbonate, and the like; a metal borate such as sodium or potassium borate, and the like; ethanolamines and amines; and other like alkaline sources. Secondary alkalinity agents are commonly available in either aqueous or powdered form, either of which is useful in formulating the present cleaning compositions. Alkalinity sources are present at concentrations of about 0 to 50 wt-%, preferably about 5-25 wt-%, more preferably about 5-15 wt-%.

Aqueous Medium

The ingredients of the composition may be processed in a minor but effective amount of an aqueous medium such as water, to provide an effective level of viscosity for processing the mixture, and to provide the processed composition with the desired amount of firmness and cohesion during solid block formation and upon hardening. The mixture preferably contains no water. The mixture during processing may include about 0.00 to 5 wt-% of an aqueous medium, preferably about 0.1 to 2 wt-%.

Optional Hardening Agent

A hardening agent, as used in the present method and compositions, is a compound or system of compounds, organic or inorganic that significantly contributes to the uniform solidification of the composition. Preferably, the hardening agents are compatible with the surfactants and other active ingredients of the composition and are capable of providing an effective amount of hardness and/or aqueous solubility to the composition. The hardening agents should also be capable of forming a homogeneous matrix with the cleaning agent and other ingredients when mixed and solidified to provide a uniform dissolution of the cleaning agent from the solid composition during use. The invention is particularly formulated for pressed solid formation and in a preferred embodiment does not need to include hardening agents.

The amount of optional hardening agent included in the cleaning composition will vary according to the type of cleaning composition being prepared, the ingredients of the composition, the intended use of the composition, the quantity of dispensing solution applied to the solid composition over time during use, the temperature of the dispensing solution, the hardness of the dispensing solution, the physical size of the solid composition, the concentration of the other ingredients, the concentration of the cleaning agent in the composition, and other like factors. It is preferred that the amount of the hardening agent is effective to combine with the cleaning agent and other ingredients of the composition to form a homogeneous mixture under continuous mixing conditions and a temperature at or below the melting temperature of the hardening agent.

One example of an organic hardening agent is a polyethylene glycol (PEG) compound for use in the above cleaning composition. The solidification rate of cleaning compositions comprising a polyethylene glycol hardening agent made according to the invention will vary, at least in part, according to the amount and the molecular weight of the polyethylene glycol added to the composition.

Polyethylene glycol compounds useful according to the invention include, for example, solid polyethylene glycols of the general formula $H(OCH_2—CH_2)_n$ OH, where n is greater than 15, more preferably about 30 to 1700. Solid polyethylene glycols which are useful are commercially available from Union Carbide under the name CARBOWAX. Typically, the polyethylene glycol is a solid in the form of a free-flowing powder or flakes, having a molecular weight of about 1000 to 100.000, preferably having a molecular weight of at least about 1450 to 20,000, more preferably between about 1450 to about 8000. Suitable polyethylene glycol compounds useful according to the invention include, for example, PEG 1450 and PEG 8000 among others. Urea is another useful hardening agent.

Additional Components

The cleaning compositions may further include conventional detergent adjuvants such as a sequestering agent, enzyme, secondary hardening agent, detergent filler, defoamer, anti-redeposition agent, a threshold agent or system, aesthetic enhancing agent (i.e., dye, perfume), and other like additives. Adjuvants and other additive ingredients will vary according to the type of composition being manufactured.

Additional Surfactant

The cleaning compositions of the invention can further comprise a surfactant or in some cases an additional surfactant. This can include water soluble or water dispersible nonionic, semi-polar nonionic (supra), anionic, cationic, amphoteric, or zwitterionic surface-active agents, or any combination thereof. A typical listing of the classes and species of surfactants useful herein appears in U.S. Pat. No. 3,664,961 issued May 23, 1972, to Norris. When present, additional surfactant can comprise from about 0.01 wt. % to about 20 wt. %, from about 0.01 wt. % to about 15 wt. % and more preferable from about 1 wt. % to about 10 wt. %.

Nonionic Surfactants

Additional nonionic surfactants useful in the invention are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants in the present invention include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronico manufactured by BASF Corp.

Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from 1,000 to 4,000. Ethylene oxide is then added to sandwich this hydrophobe between hydrophilic groups, controlled by length to constitute from about 10% by weight to about 80% by weight of the final molecule.

Tetronic® compounds are tetra-functional block copolymers derived from the sequential addition of propylene oxide and ethylene oxide to ethylenediamine. The molecular weight of the propylene oxide hydrotype ranges from 500 to 7,000; and, the hydrophile, ethylene oxide, is added to constitute from 10% by weight to 80% by weight of the molecule.

2. Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Vista Chemical Co.

4. Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from 1,000 to 3,100 with the central hydrophile including 10% by weight to 80% by weight of the final molecule. These reverse Pluronics® are manufactured by BASF Corporation under the trade name Pluronic® R surfactants.

Likewise, the Tetronic® R surfactants are produced by BASF Corporation by the sequential addition of ethylene oxide and propylene oxide to ethylenediamine. The hydrophobic portion of the molecule weighs from 2,100 to 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula:

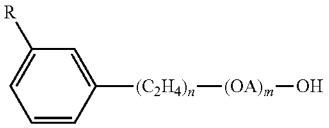

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from 1 to 6 carbon atoms and one reactive hydrogen atom, n has an average value of at least 6.4, as determined by hydroxyl number and m has a value such that the oxyethylene portion constitutes 10% to 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from 2 to 6 carbon atoms and containing x reactive hydrogen atoms in which x has a value of at least 2, n has a value such that the molecular weight of the polyoxypropylene hydrophobic base is at least 900 and m has value such that the oxyethylene content of the molecule is from 10% to 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R^2CONR^1Z$ in which: $R^1$ is H, $C_1$-$C_4$ hydrocarbyl, 2-hydroxy ethyl, 2-hydroxy propyl, ethoxy, propoxy group, or a mixture thereof; R is a $C_5$-$C_3$1 hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction, such as a glycityl moiety.

9. The alkyl ethoxylate condensation products of aliphatic alcohols with from 0 to 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_{10}$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from 6 to 30 carbon atoms and a polysaccharide, e.g., a polyglycoside, hydrophilic group containing from 1.3 to 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use in the present compositions include those having the formula: $R^6CON(R^7)_2$ in which $R^6$ is an alkyl group containing from 7 to 21 carbon atoms and each $R^7$ is independently hydrogen, $C_1$-$C_4$ alkyl, $C_1$-$C_4$ hydroxyalkyl, or $—(C_2H_4O)_xH$, where x is in the range of from 1 to 3.

13. A useful class of non-ionic surfactants includes the class defined as alkoxylated amines or, most particularly, alcohol alkoxylated/aminated/alkoxylated surfactants. These non-ionic surfactants may be at least in part represented by the general formulae:

$$R^{20}—(PO)_sN\text{-}(EO)_tH,$$

$$R_20—(PO)_sN\text{-}(EO)_tH(EO)_tH, \text{ and}$$

$$R^{20}—N(EO)_tH;$$

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula:

$$R^{20}—(PO)_v—N[(EO)_wH][(EO)_zH]$$

in which $R^{20}$ is as defined above, v is 1 to 20 (e.g., 1, 2, 3, or 4 (preferably 2)), and w and z are independently 1-10, preferably 2-5.

These compounds are represented commercially by a line of products sold by Huntsman Chemicals as nonionic surfactants. A preferred chemical of this class includes Surfonic™ PEA 25 Amine Alkoxylate.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Additional Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

As those skilled in the art understand, anionics are excellent detersive surfactants and are therefore favored additions to heavy duty detergent compositions. Generally, however, anionics have high foam profiles which limit their use alone or at high concentration levels in cleaning systems such as CIP circuits that require strict foam control. Anionic surface active compounds are useful to impart special chemical or physical properties other than detergency within the composition. Anionics can be employed as gelling agents or as part of a gelling or thickening system. Anionics are excellent solubilizers and can be used for hydrotropic effect and cloud point control.

The majority of large volume commercial anionic surfactants can be subdivided into five major chemical classes and additional sub-groups known to those of skill in the art and described in "Surfactant Encyclopedia," Cosmetics & Toiletries, Vol. 104 (2) 71-86 (1989). The first class includes acylamino acids (and salts), such as acylgluamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like.

Anionic sulfate surfactants suitable for use in the present compositions include the linear and branched primary and secondary alkyl sulfates, alkyl ethoxysulfates, fatty oleyl glycerol sulfates, alkyl phenol ethylene oxide ether sulfates, the $C_5$-$C_1$7 acyl-N—($C_1$-$C_4$ alkyl) and —N—($C_1$-$C_2$ hydroxyalkyl)glucamine sulfates, and sulfates of alkylpolysaccharides such as the sulfates of alkylpolyglucoside (the nonionic nonsulfated compounds being described herein).

Examples of suitable synthetic, water soluble anionic detergent compounds include the ammonium and substituted ammonium (such as mono-, di- and triethanolamine) and alkali metal (such as sodium, lithium and potassium) salts of the alkyl mononuclear aromatic sulfonates such as the alkyl benzene sulfonates containing from 5 to 18 carbon atoms in the alkyl group in a straight or branched chain, e.g., the salts of alkyl benzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

Anionic carboxylate surfactants suitable for use in the present compositions include the alkyl ethoxy carboxylates, the alkyl polyethoxy polycarboxylate surfactants and the soaps (e.g. alkyl carboxyls). Secondary soap surfactants (e.g. alkyl carboxyl surfactants) useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present.

Other anionic detergents suitable for use in the present compositions include olefin sulfonates, such as long chain alkene sulfonates, long chain hydroxyalkane sulfonates or mixtures of alkenesulfonates and hydroxyalkane-sulfonates. Also included are the alkyl sulfates, alkyl poly(ethyleneoxy) ether sulfates and aromatic poly(ethyleneoxy)sulfates such as the sulfates or condensation products of ethylene oxide and nonyl phenol (usually having 1 to 6 oxyethylene groups per molecule). Resin acids and hydrogenated resin acids are also suitable, such as rosin, hydrogenated rosin, and resin acids and hydrogenated resin acids present in or derived from tallow oil.

The particular salts will be suitably selected depending upon the particular formulation and the needs therein.

Further examples of suitable anionic surfactants are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced, or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution. The simplest cationic amines, amine salts and quaternary ammonium compounds can be schematically drawn thus:

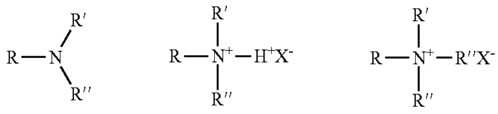

in which, R represents a long alkyl chain, R', R", and R''' may be either long alkyl chains or smaller alkyl or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

In a preferred embodiment, the composition does not include any cationic surfactants.

Amphoteric Surfactants

Amphoteric, or ampholytic, surfactants contain both a basic and an acidic hydrophilic group and an organic hydrophobic group. These ionic entities may be any of the anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia," Cosmetics & Toiletries, Vol. 104 (2) 69-71 (1989). The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

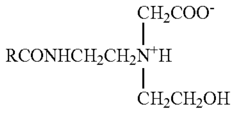

(MONO)ACETATE

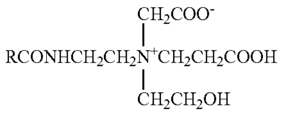

(DI)PROPINATE

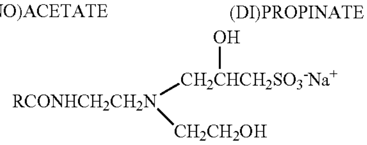

Neutral pH Zwitterion
AMPHOTERIC SULFONATE wherein R is an acyclic hydrophobic group containing from 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Preferred amphocarboxylic acids are produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reacting $RNH_2$, in which R.dbd.$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In these, R is preferably an acyclic hydrophobic group containing from 8 to 18 carbon atoms, and M is a cation to neutralize the charge of the anion.

Preferred amphoteric surfactants include those derived from coconut products such as coconut oil or coconut fatty acid. The more preferred of these coconut derived surfactants include as part of their structure an ethylenediamine moiety, an alkanolamide moiety, an amino acid moiety, preferably glycine, or a combination thereof; and an aliphatic substituent of from 8 to 18 (preferably 12) carbon atoms. Such a surfactant can also be considered an alkyl amphodicarboxylic acid. Disodium cocoampho dipropionate is one most preferred amphoteric surfactant and is commercially available under the tradename Miranol™ FBS from Rhodia Inc., Cranbury, N.J. Another most preferred coconut derived amphoteric surfactant with the chemical name disodium cocoampho diacetate is sold under the tradename Miranol C2M-SF Conc., also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Zwitterionic Surfactants

Zwitterionic surfactants can be thought of as a subset of the amphoteric surfactants. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion, a negative charged carboxyl group, and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants for use herein.

A general formula for these compounds is:

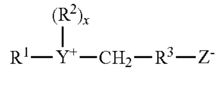

wherein R1 contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; R.sup.2 is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-car-boxylate; 5-[S-3-hydroxypropyl-S-hexadecylsulfonio]-3-hydroxypentane-1-sul-fate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propan-e-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxyl-ate; 3-[S-ethyl-S-(3-dodecoxy-2-hydroxypropyl) sulfonio]-propane-1-phosphat-e; 3-[P,P-dimethyl-P-dodecylphosphonio]-propane-1-phosphonate; and S [N,N-di (3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

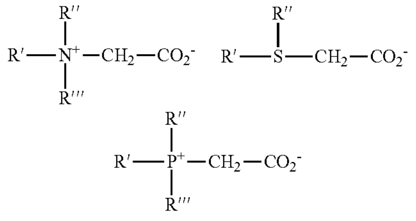

These surfactant betaines typically do not exhibit strong cationic or anionic characters at pH extremes, nor do they show reduced water solubility in their isoelectric range. Unlike “external” quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R1)_2N$.sup.+$R^2SO^3$—, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in “Surface Active Agents and Detergents” (Vol. I and II by Schwartz, Perry and Berch). The composition may include 0.5-10 wt %, or 1-5 wt %, of surfactant or additional surfactant.

Chelating/Sequestering Agents

The composition may include a chelating/sequestering agent such as an aminocarboxylic acid, a condensed phosphate, a phosphonate, a polyacrylate, and the like. In general, a chelating agent is a molecule capable of coordinating (i.e., binding) the metal ions commonly found in natural water to prevent the metal ions from interfering with the action of the other detersive ingredients of a cleaning composition. Depending on the type of cleaning composition being formulated, a chelating/sequestering agent is included in an amount of about 0.1 to 70 wt-%, preferably from about 5 to 50 wt-%.

Useful aminocarboxylic acids include, for example, n-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), and the like. Examples of condensed phosphates useful in the present composition include, for example, sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

The composition may include a phosphonate such as aminotris(methylene phosphonic acid), hydroxyethylidene diphosphonic acid, ethylenediaminetetra(methylene phosphonic acid), diethylenetriaminepente(methylene phosphonic acid), and the like. It is preferred to use a neutralized or alkaline phosphonate, or to combine the phosphonate with an alkali source prior to being added into the mixture such that there is little or no heat generated by a neutralization reaction when the phosphate is added.

Polyacrylates suitable for use as cleaning agents include, for example, polyacrylic acid, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Detergent Fillers

A cleaning composition may include a minor but effective amount of one or more of a detergent filler, which does not perform as a cleaning agent per se, but cooperates with the cleaning agent to enhance the overall cleaning action of the composition. Examples of fillers suitable for use in the present cleaning compositions include sodium sulfate, sodium chloride, starch, sugars, and $C_1$-$C_{10}$ alkylene glycols such as propylene glycol, and the like. Preferably, the filler is included in an amount of about 1 to 60 wt-%, preferably about 3 to 50 wt-%.

Defoaming Agents

A minor but effective amount of a defoaming agent for reducing aeration during processing may also be included in a cleaning composition. Preferably, the cleaning composition includes about 0.0001 to 5 wt-% of a defoaming agent, preferably about 0.01 to 1 wt-%.

Examples of defoaming agents suitable for use in the present compositions include silicone compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found in U.S. Pat. No. 3,048,548 to Martin et al., U.S. Pat. No. 3,334,147 to Brunelle et al., and U.S. Pat. No. 3,442,242 to Rue et al., the disclosures of both references incorporated by reference herein.

Anti-Redeposition Agents

A cleaning composition may also include an anti-redeposition agent capable of facilitating sustained suspension of soils in a cleaning solution and preventing removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, carboxymethyl cellulose, and the like. A cleaning composition may include about 0.5 to 10 wt-%, preferably about 1 to 5 wt-%, of an anti-redeposition agent.

Dyes/Odorants

Various dyes, odorants including perfumes, and other aesthetic enhancing agents may also be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical Co.), Fluorescein (Capitol Color and Chemical), Rhodamine (D&C Red No. 19), Sap Green (Keystone Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C IS-jasmine or jasmal, vanillin, and the like.

Processing of the Composition

The present solid composition can be made by an advantageous method of pressing the solid composition. Specifically, in a forming process, the liquid and solid components are introduced into the final mixing system and are mixed until the components form a substantially homogeneous semi-solid mixture in which the components are distributed throughout its mass. In an exemplary embodiment, the components are mixed in the mixing system for a minimum of 5 seconds. The mixture is then discharged from the mixing system into, or through, a die, press or other shaping means. The product is then packaged. In an exemplary embodiment, the solid formed composition can begin to harden immediately, but may begin to harden between approximately 1 minute and approximately 3 hours. Particularly, the formed composition begins to harden in between approximately 1 minute and approximately 2 hours. More particularly, the formed composition begins to harden in between approximately 1 minute and approximately 20 minutes.

Pressing can employ low pressures compared to conventional pressures used to form tablets or other conventional solid detergent compositions. For example, in an embodiment, the present method employs a pressure on the solid of only less than or equal to about 1000 psi. In certain embodiments, the present method employs pressures of less than or equal to about 900 psi, less than or equal to about 800 psi, or less than or equal to about 700 psi. In certain embodiments, the present method can employ pressures as low as greater than or equal to about 500 psi. In certain embodiments, the present method can employ pressures of about 500 to about 3000 psi. The method of the present invention can produce a stable solid without employing a melt and solidification of the melt as in conventional casting. Forming a melt requires heating a composition to melt it. The heat can be applied externally or can be produced by a chemical exotherm (e.g., from mixing caustic (sodium hydroxide) and water). Heating a composition consumes energy. Handling a hot melt requires safety precautions and equipment. Further, solidification of a melt requires cooling the melt in a container to solidify the melt and form the cast solid. Cooling requires time and/or energy. The solids of the present invention are held together not by solidification from a melt but by a combination of compression and binding agent(s) produced in the admixed particles and that is effective for producing a stable solid.

The method of the present invention can produce a stable solid without extruding to compress the mixture through a die. Conventional processes for extruding a mixture through a die to produce a solid composition apply high pressures to a solid or paste to produce the extruded solid. In contrast, the present method employs pressures on the solid of only less than or equal to about 3000 psi or even as little as 500 psi.

While the invention advantageously may be formed to solid by pressing, other methods of solid formation may also be used such as extrusion, cast molding and the like.

In an exemplary embodiment, a single- or twin-screw extruder may be used to combine and mix one or more components agents at high shear to form a homogeneous mixture. In some embodiments, the processing temperature is at or below the melting temperature of the components. The processed mixture may be dispensed from the mixer by pressing, forming, extruding or other suitable means, whereupon the composition hardens to a solid form. The structure of the matrix may be characterized according to its hardness, melting point, material distribution, crystal structure, and other like properties according to known methods in the art. Generally, a solid composition processed according to the method of the invention is substantially homogeneous with regard to the distribution of ingredients throughout its mass and is dimensionally stable.

The resulting solid composition may take forms including, but not limited to: an extruded, molded or formed solid pellet, block, tablet, powder, granule, flake; or the formed solid can thereafter be ground or formed into a powder, granule, or flake. In an exemplary embodiment, extruded pellet materials formed have a weight of between approximately 50 grams and approximately 250 grams, extruded solids have a weight of approximately 100 grams or greater, and solid blocks formed have a mass of between approximately 1 and approximately 10 kilograms. The solid compositions provide for a stabilized source of functional materials. In a preferred embodiment, the solid composition may be dissolved, for example, in an aqueous or other medium, to create a concentrated and/or use solution. The solution may be directed to a storage reservoir for later use and/or dilution or may be applied directly to a point of use.

In certain embodiments, the solid detergent composition is provided in the form of a unit dose. A unit dose refers to a solid detergent composition unit sized so that the entire unit is used during a single washing cycle. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid detergent composition is provided in the form of a multiple-use solid, such as, a block or a plurality of pellets, and can be repeatedly used to generate aqueous rinse compositions for multiple washing cycles. In certain embodiments, the solid detergent composition is provided as a solid having a mass of about 5 g to 10 kg. In certain embodiments, a multiple-use form of the solid detergent composition has a mass of about 1 to 10 kg. In further embodiments, a multiple-use form of the solid detergent composition has a mass of about 5 kg to about 8 kg. In other embodiments, a multiple-use form of the solid detergent composition has a mass of about 5 g to about 1 kg, or about 5 g and to 500 g.

Dispensing of the Processed Compositions

It is preferred that a solid block cleaning composition made according to the present invention is dispensed from a spray-type dispenser such as those disclosed in U.S. Pat. Nos. 4,826,661, 4,690,305, 4,687,121, and 4,426,362, the disclosures of which are incorporated by reference herein. Briefly, a use solution is created by contacting the block, and then immediately directing the concentrate solution comprising the composition out of the dispenser to a storage reservoir or directly to a point of use.

Compositions of the Invention

Sample formulations of the invention are set out below in wt. %:

| | | | |
|---|---|---|---|
| Anionic sulfonate Surfactant | 0.1-97 | 1-95 | 5-80 |
| Alkalinity source | 0-45 | 1-50 | 5-40 |
| Inorganic salt | 0-15 | 0.1-10 | 1-8 |
| Acrylic polymer | 0-15 | 0.1-10 | 1-8 |
| Nonionic surfactant | 0.01-30 | 0.1-35 | 1-40 |

The invention is illustrated further by, but is not intended to be limited to, the following examples.

EXAMPLES

Cylinder Foam Test Conditions:

Machine: Cylinder rotating device

Rotating Speed: ~300 rpm

Water Hardness: 5 gpg

Temperature: Room temperature

Test Method: Modified MKS-SOP-001

Cylinder Foam Test Soil:

45 wt % Crisco Shortening 30 wt % All-Purpose Flour 15 wt % Powdered Whole Egg 10 wt % Oleic Acid Stainless Steel Coupon Test Method Test Conditions:

Machine: Magnetic stir plate and stir bars

Rotating Speed: 300 rpm

Water Hardness: 5 gpg

Temperature: Room Temperature

Test Method: Stainless steel coupon test method

Stainless Steel Coupon Test Soil:

50% Crisco Shortening

40% Powdered Whole Egg

10% Vegetable Oil

Control Formulation:

The compositions of the invention were tested against a commercial extruded solid pot and pan detergent containing alkyl polyglucosides, PEGor urea thickeners, and no alkalinity source or/other processing aids as defined herein.

| Raw Material | Prototype 22 wt % | Prototype 24 wt % | Prototype 39 wt % | Prototype 40 wt % |
|---|---|---|---|---|
| Anionic surfactant, salt | 60.45 | 54.45 | 54.45 | 90 |
| Inorganic salt | 4.14 | 43.05 | 33.32 | 0 |
| Nonionic surfactant | 10.00 | 2.50 | 2.50 | 10 |
| Alkalinity source | 10 | 0 | 9.73 | 0 |
| Total | 100.00 | 100.00 | 100.00 | 100 |

Cylinder Foam Test

Purpose:

This test method is used to screen manual dish washing detergents for foam height and stability. This method could be applied to any manual dish washing detergent but can potentially be used to measure foam height and stability of any detergent or cleaner.

Test Detergents:

Solid detergents are tested at 0.2 oz/gal (1.5 g/L) with 5 grain water at room temperature.

Liquid detergents are tested at 0.4 oz/gal (3 g/L) with 5 grain water at room temperature.

Experimental Procedure:

Add 40 mL of test detergent to a 250 mL graduated cylinder. Repeat for each detergent to be tested.

Allow all cylinders and test solutions to reach room temperature. It is important to have them reach this temperature as warmer solutions will yield higher foam heights.

Liquefy soil by placing on a hot plate at 200° F. The soil does not need to be hot, just a homogeneous liquid. Make sure the soil is uniform every time before adding drops to the cylinders.

Stopper all cylinders, place in foam cylinder apparatus and securely tighten.

Rotate cylinders at 30 rpm for 4 minutes (30 rpm corresponds to the black line on the machine). After 4 minutes, record initial foam height (mL of foam). Foam height is the total volume of liquid and foam, calculations in the foam test template will subtract out the liquid height to just get total foam.

Add 2 drops of test soil using a disposable pipette to the center of the cylinder. Avoid letting the soil drip down the sides of the cylinders.

Rotate the cylinders at 30 rpm for 2 minutes. Record foam height and add 2 more drops of test soil using a disposable pipette.

Repeat step 7 until foam height (liquid and foam height) is at 45 mL or less.

Perform 3 to 5 replicates for each detergent.

Stainless Steel Coupon Test Method

Purpose:

This test method is used to screen manual dish washing detergents based on soil removed from stainless steel surfaces after a soak in the detergent solution.

Test Detergents and Control:

All detergents, solids and liquids, are tested at 5 g/L (not by actives) in 5 grain water at room temperature Experimental Procedure:

Count the number of coupons that will be used and multiply that by 2. Measure this amount of soil that will be mixed and heated until a thick consistency is observed (numerical consistency was not measured (viscosity) but can be gauged based on the flow; if the soil can run down a stainless steel coupon in a vertical position, then the soil is too liquidy; if the soil stays on the surface of the coupon in a vertical position then the consistency is correct)

Apply 1.4-1.5 g of heated soil onto the stainless steel coupon leaving ½ inch at the top and bottom unsoiled. Record weight of soil applied onto each coupon (WT). Leave soiled coupons on the bench to dry/cure for 2-3 hours.

Add 12.5 g of detergent in 600 ml beakers and fill with 5 grain water up to 500 g. Mix with a magnetic stir bar until everything has been dissolved.

Repeat this step for all the detergents (positive and negative controls, and test detergents). This is the stock concentrate of detergent.

Measure out 140 g of the stock concentrate into a 1 liter beaker. Fill each 1 liter beaker with 560 g of 5 grain water. Mix with a magnetic stir bar at 300 rpm. This will be the soiled coupon soak solution. Three soak solution beakers are made for each detergent solution since everything is done in triplicate.

Tare the balance. Weigh and record the stainless steel coupon (this weight is before soak which also contains the amount of soil too, Wb).

Prepare timer for 20 minutes and place coupons into each soak solution beaker with the magnetic stir bar. Soiled coupons are soaked for 20 minutes.

After 20 minutes are up, remove soiled coupon from soak solution and place onto the aluminum pan where the front and back are rinsed with DI water. The soaked coupons are then dried vertically on a rack overnight where the total weight (WA) after is measured and recorded.

Repeat steps 6 and 7 for each detergent.

Data is shown in the Figures herewith.

What is claimed is:

1. A solid detergent composition comprising:

(a) from about 40 wt. % to about 95 wt. % of a neutralized anionic sulfonated surfactant, (b) a fatty acid amide surfactant comprising at least one of lauric monoethanol amide, cocomonoethanol amide, or a mixture thereof; and (c) a processing aid including one or more of: an inorganic salt, a source of alkalinity, and/or an acrylic polymer, wherein said composition is pressed to form a solid, wherein said composition is free of polyethylene glycol and a bleaching agent.

2. The composition of claim 1 wherein said processing aid is an inorganic salt.

3. The composition of claim 1 wherein said processing aid is a source of alkalinity.

4. The compositions of claim 1 wherein said composition is essentially free of a cationic surfactant.

5. The composition of claim 2 wherein the inorganic salt comprises magnesium salt.

6. The composition of claim 1, wherein the anionic sulfonated surfactant comprises at least one of alkylsulfonate, alkylarylsulfonate, sulfonated fatty acid ester, sulfated alcohol, sulfated alcohol ethoxylate, sulfated alkylphenol, alkyl sulfate, dialkylsulfosuccinate, alkylether-sulfate, and mixtures thereof.

7. The composition of claim 1 wherein said anionic sulfonated surfactant is a linear alkyl benzene sulfonate.

8. The composition of claim 1 wherein said fatty acid amide is cocomonoethanolamide.

9. The composition of claim 1, wherein the composition further comprises an amphoteric surfactant.

10. The composition of claim 9, wherein the amphoteric surfactant comprises at least one of β-N-alkylaminopropionic acid, N-allyl-β-iminodipropionic acid, imidazoline carboxylate, N-alkylbetaine, N-alkylamidoalkylbetaine, sultaine, amines, and mixtures thereof.

11. The composition of claim 10, wherein the amphoteric surfactant comprises cocoamidopropylbetaine.

12. The composition of claim 1, further comprising a chelating agent, defoaming agent, and/or anti-redisposition agent.

13. The composition of claim 1, wherein the solid detergent composition is provided in the form of a block.

14. A method of cleaning ware comprising:

diluting the composition of claim 1 with water to form a use solution, contacting said solution with said ware, and thereafter rising said solution from the ware.

15. The composition of claim 1, wherein said fatty acid amide surfactant is included in an amount of from about 0.1 wt. % to about 15 wt. %.

16. The method of claim 14, wherein the ware comprises pots and pans.

* * * * *